United States Patent [19]
Guell et al.

[11] Patent Number: 5,539,951
[45] Date of Patent: Jul. 30, 1996

[54] WIPER BLADE ASSEMBLY INCLUDING HEATING AND FLUID DISPENSING MEANS

[76] Inventors: Ronald R. Guell; Susan K. Guell, both of N4997 Summitt Dr., Fond du Lac, Wis. 54935

[21] Appl. No.: 569,455

[22] Filed: Dec. 8, 1995

[51] Int. Cl.⁶ ............................. B60S 1/46; B60S 1/38
[52] U.S. Cl. ........................... 15/250.04; 15/250.02; 15/250.06; 15/250.48; 219/202
[58] Field of Search ................. 15/250.06, 250.07, 15/250.08, 250.9, 250.04, 250.48, 250.02; 219/202, 203

[56] References Cited

U.S. PATENT DOCUMENTS

| | | | |
|---|---|---|---|
| 3,418,676 | 12/1968 | Byczkowski et al. | 15/250.04 |
| 3,716,886 | 2/1973 | Klomp | 15/250.04 |
| 3,936,901 | 2/1976 | Theckston | 15/250.06 |
| 5,065,471 | 11/1991 | Laplante | 15/250.04 |
| 5,426,814 | 6/1995 | Minnick | 15/250.06 |
| 5,488,752 | 2/1996 | Randolph | 15/250.06 |

FOREIGN PATENT DOCUMENTS

| | | | |
|---|---|---|---|
| 2329481 | 5/1977 | France | 15/250.04 |

*Primary Examiner*—Gary K. Graham

[57] ABSTRACT

This invention relates to a new and useful improvement in a wiper for use on the windshields of vehicles, such as automobiles, trucks, trains, boats, airplanes and the like, and more particularly to improvements in a windshield wiper which is electrically heated so as to prevent the accumulation of ice, sleet or snow on the wiper blade. A spiral coiled heating element of resistance wire and a fluid dispensing arrangement for dispensing heated fluid are disposed substantially within the entire length of the passageway of the wiper blade. Tubes of electrical conductive material enter the passageway at the first and second passageway ends thus providing a means for both heat and/or fluid conveyance and an entrance and exits for the current and fluid. The ends are then sealed with a moisture proof sealant which also serves to maintain stability of end connections. The heating arrangement is connected to the vehicle battery to heat the heating element and fluid contained inside the blade passageway allowing the entire outer circumference of the wiper body and the wiping surfaces to melt ice surrounding the wiper and ice present on the windshield. Therefore the fluid is prevented from freeze-up and spray nozzle remains operable. The reciprocating spray nozzle is designed to spray ahead of wiper in both upward and downward movement. If desired the fluid dispensing arrangement can be used without heating the fluid.

2 Claims, 2 Drawing Sheets

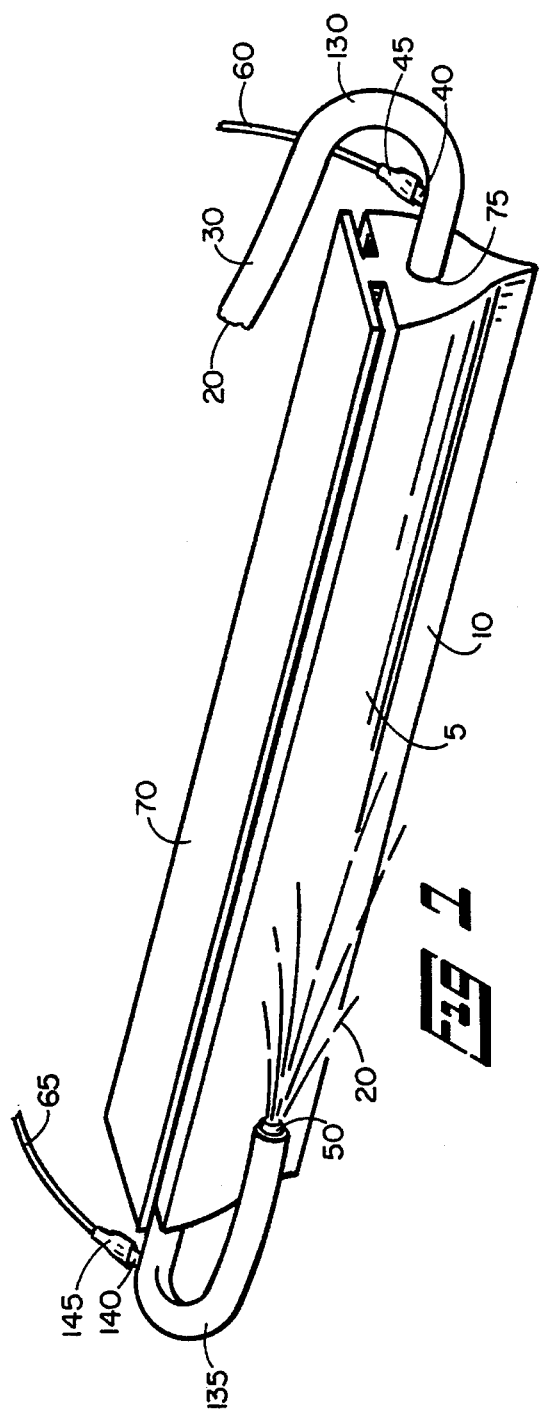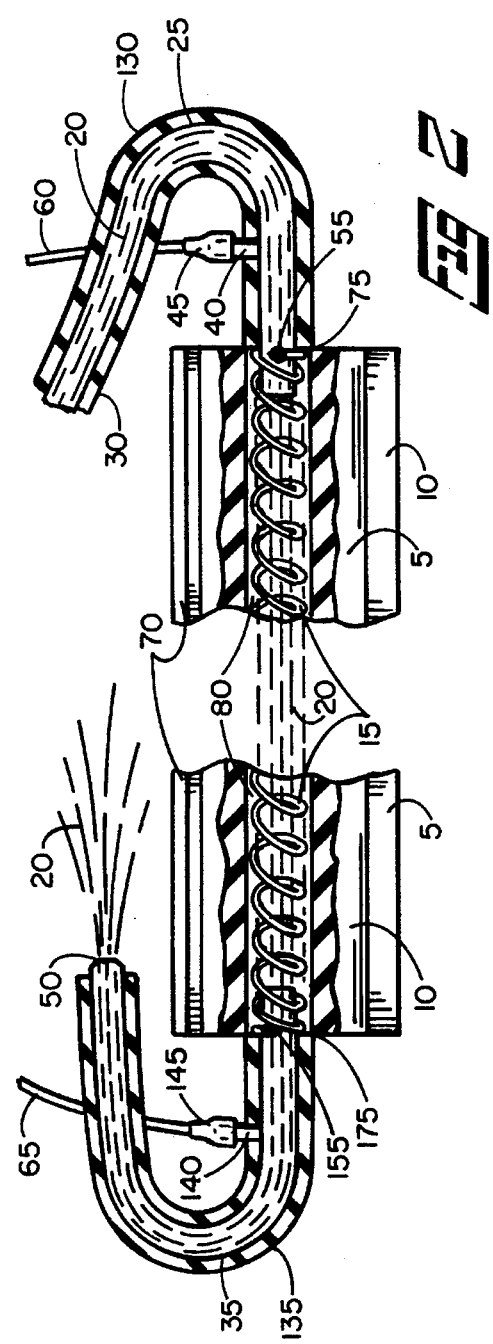

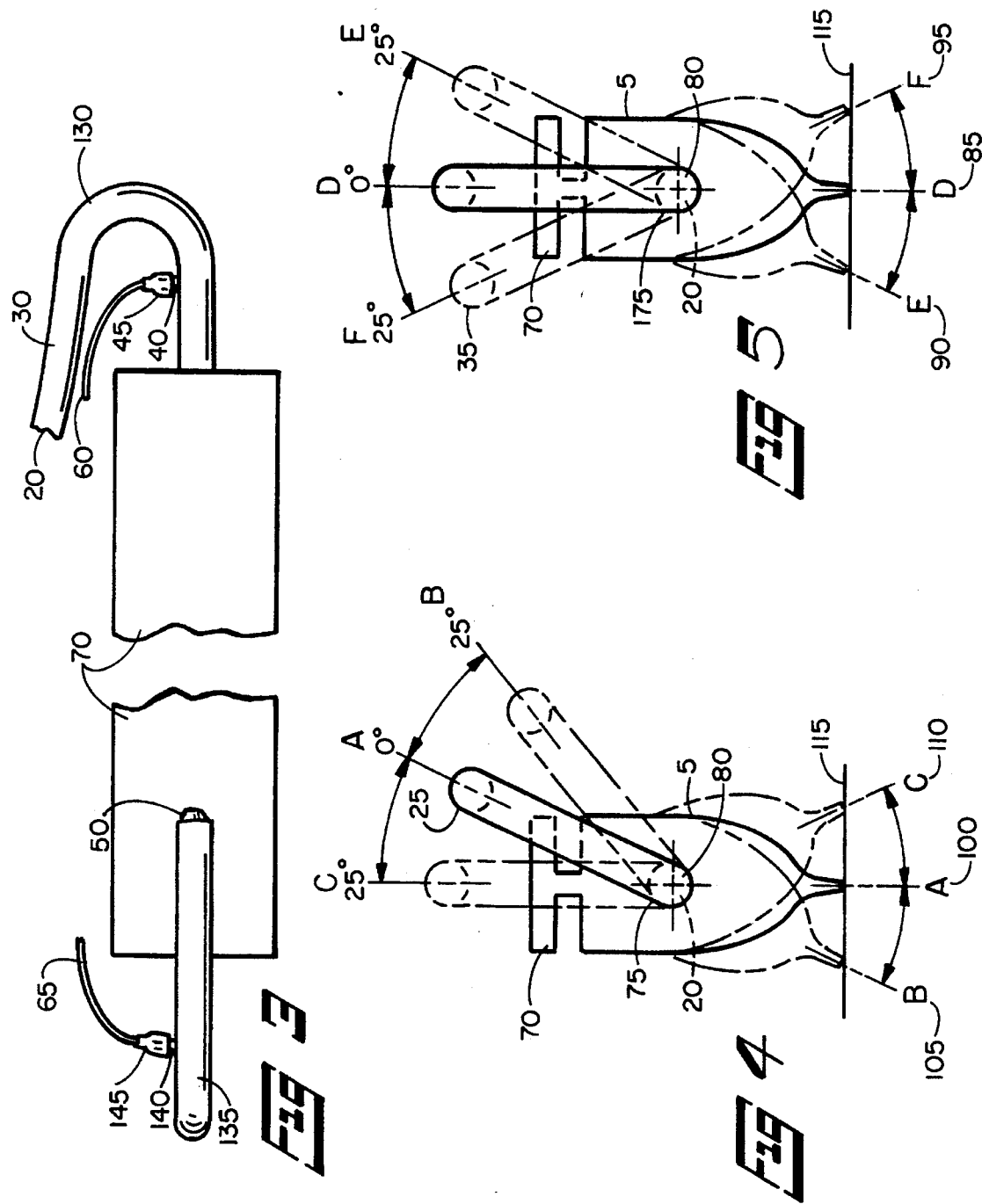

WIPER BLADE ASSEMBLY INCLUDING HEATING AND FLUID DISPENSING MEANS

FIELD OF INVENTION

This invention relates generally to heated wiper blade units which incorporates a fluid dispensing arrangement. More particularly this invention relates to a wiper blade heating element; means of heating the fluid within the passageway; and a fluid dispensing arrangement which are suitable for incorporating into a newly designed or current wiper blade art.

BACKGROUND OF INVENTION

When a vehicle is operated during blizzard, snow, sleet, or other inclement conditions, precipitation may not be cleared away because the wiper blade becomes lodged with ice and snow build-up, whereupon the blade pushes away from the windshield because of this build-up. The vehicle defroster is incapable of heating the windshield sufficiently to melt the frozen precipitation forming on the blade and its associated mounting and the area to be cleaned. When there is a build-up upon the wiper blade, the wiper blade edge no longer has contact with the windshield. Thus the blade cannot perform the intended function of wiping precipitation from the windshield ultimately severely reducing the vision of the vehicle operator, thereby creating driving hazards which in many instances have resulted in serious accidents.

It has been heretofore proposed that windshield wiper blades and fluid be heated so as to eliminate the hazards noted above. The main object of the present invention is to provide an improved heating means to a windshield wiper blade which incorporates a fluid dispensing arrangement that is particularly designed to be adapted for commercial large scale production. To this end, it is proposed to provide a blade and fluid heating and/or dispensing arrangement which will make maximum use of the electrical energy required for heating the fluid, the blade assembly, and windshield, that is, there will be a far more efficient heating means of the blade and of the windshield traversed by the blade in relation to the amount of electrical energy expended for heating the blade assembly, than has been provided by previous devices conceived for the same purpose. Additionally this invention prevents the accumulation of snow or ice on the windshield.

The wiper blade in which the heating element and fluid dispensing arrangement is incorporated must be constructed of heat resistant material, such as Polymer; so that the material of the blade does not deteriorate in temperatures of up to 220 degrees Fahrenheit; and also incorporate an elongated passageway extending through the central portion of the blade. Such heat resistant blades with elongated passageway are commercially available as "TripleEdge" (U.S. Pat. No. 4,473,919 to Fritz jr. of Oct. 2, 1984) and "Quadrablade" ( Trademark of Lifetime Automotive, PO Box 795428, Dallas, Tex. 75379-5428). The heating element and associated fluid dispensing arrangement of this invention can be inserted within the passageway of said or similar blades. A highly effective heated wiper blade and fluid dispensing arrangement can be created by modifying a new or existing marketed single or multi-edged blade by utilizing applicant's heating element, fluid dispensing arrangement, associated components, and circuitry.

There have been a variety of attempts to improve the wiping action of a windshield wiper to clean the outer surface of a windshield in cold weather.

U.S. Pat. No. 4,152,808 discloses a heating element of 0.125 inch wide and 0.005 inch thick embedded in the sides of a frame adapted to receive a wiper blade. In the upward direction heat is transferred to the frame and linkage elements. In the downward direction, heat is transferred from the element to the frame, from the frame through a gap in the wiper body carrying the blade and finally down to the blade. In the outward lateral direction, heat is transferred to the surrounding air and essentially wasted. This indirect heating method is accordingly inefficient, and limits the flexibility of the blade, thereby inhibiting the blade wiping action.

U.S. Pat. No. 4,360,941 discloses a second, rather complex windshield wiper assembly which incorporates a weather protective hood utilizing electrical conductors affixed on the outer wall of the hood and other conductors affixed on the inner wall of the hood to heat the hood and frame to prevent the accumulation of ice.

U.S. Pat. No. 2,194,6771 discloses a heating means wound around a fibrous core along with an asbestos covering which are fixed and bound together and placed with the wiper tube with no space between components. The heating means is dependent on a fibrous core member and an asbestos sheath. Because of the dependent nature of the heating wire, flexibility is very limited.

U.S. Pat. No. 5,325,561 discloses an unnecessarily complex and inefficient circuitry system. The heating element consists of straight wire which is less than ⅓ of the width of the passageway. Thus the heating element can lie on the passageway causing hot spots and decreasing efficiency and causing blade damage. A thin straight wire has greater probability of breakage or failure. There are several resistors wired in parallel which create substantial heat loss to the overall circuitry. A solution as to how to cope with these very hot resistors is not discussed. This invention teaches the use of multiple connectors which appear to be very prone to damage and disconnection from normal usage and daily occurrences. This invention does not provide sufficient heat to melt ice and snow build-up on the wiper blade in adverse weather conditions without the addition of a protective cover to trap the heat. Such a protective cover can lead to the retention of condensation which can cause rapid deterioration of the blade holder and associated components. The path through which the resistance wire travels and its various connections is quite complex in order to provide the blade with heat.

U.S. Pat No. 5,426,814 discloses a wiper blade with a helical heating arrangement which is in direct contact with the interior blade surface dispensing fluid arrangement; and an air expansion system to fracture ice present on the wiper blade. This invention teaches that the blade can be constructed of material such as natural rubber. This invention does not provide sufficient heat to melt ice build-up on the wiper blade without an air expansion system to fracture ice present on the wiper blade.

The devices disclosed in the aforementioned patents leave much to be desired from the standpoint of simplicity of construction or are not sufficiently flexible to be used with windshields of any desired lateral or longitudinal curvature; some heating element designs cause extremely localized heating which places undue thermal stress on the material of the blade. Some require specialized wiper blade frames and/or wiper arm assemblies. Most prior art does not disclose a solution for preventing and eliminating ice and snow build-up on the wiper blade and associated assemblies and the windshield.

Accordingly, it is an object of the present invention to provide a simple, low cost wiper blade heating and fluid dispensing arrangement which is capable of removing and/ or preventing ice or snow build-up, road film and dirt on the wiper blade and associated assemblies and the windshield. It is a further object of this invention to provide a flexible wiper blade heating element and heated fluid dispensing arrangement suitable for incorporation into new or existing wiper blades and associated assemblies; which is not fatigued by the repeated stresses of reciprocation; easy to replace and install; able to adapt to use on windshields having most any lateral or longitudinal curvature It is yet a further object of this invention to provide a wiper blade heating and heated fluid dispensing arrangement which permits the wiper blade to conform to the shape of the windshield under snow, sleet and all other conditions. Thus providing satisfactory wiping performance while simultaneously removing and keeping the wiper blade, frame, linkage, and windshield free from interference by ice, snow, road film and dirt.

Another object is to provide a wiper blade, fluid reservoir, heating and fluid dispensing arrangement which allows for each 12 Volt blade to be calibrated so as to eliminate complexity, multiple connectors, timer, thermostat, and resistors by designing the heating wire to serve as the heating element, resistor, and incorporating a heated fluid chamber and dispensing means within this arrangement for immediate fluid use.

It is to be understood that this invention is not limited in its application to the details of construction and to the following description or illustrations in the drawings. This invention is capable of other embodiments and of being practiced and carried out in various ways, also. It is to be understood that the phraseology and terminology employed herein are for the purpose of description and should not be regarded as limiting.

SUMMARY OF INVENTION

The principle object of the present invention is to provide a new heated windshield wiper construction wherein the same can be utilized for clearing and removing ice formations on both the wiper and the windshield or other surface to be wiped clear, such as rear window or head lights. As such, the general purpose of the present invention, which will be described subsequently in greater detail, is to provide a unique windshield apparatus which has many advantages of the wipers mentioned heretofore and many novel features that result in a heated windshield wiper which is not anticipated, rendered obvious, suggested, or even implied by any of the prior art wipers, either alone or in any combination thereof.

To attain this, the present invention comprises a wiper blade formed of heat resistant material, which includes a hollow horizontal passageway extending the entire length of the wiper blade. A spiral coiled heating element is positioned through the entire length of the passageway within the wiper blade body. An electrical conductive tube, such as copper, brass, etc, is received within the first end of the heating element and is securely soldered, bonded or otherwise fastened to the spiral coiled heating element. A second similar electrical conductive tube is likewise received within the second end of the spiral coiled heating element and is also securely soldered, bonded or otherwise fastened. Thus a firm connection with the first and second electrical conductive tubes is achieved with the first and second ends of the heating element without the necessity of additional parts, such as butt connectors. The entire length of the blade body and wiping surfaces may be heated to melt ice surrounding the wiper and present on the windshield while simultaneously holding and heating fluid which is immediately available for use when needed. Ice and snow build-up is prevented from forming on the wiper and windshield. Fluid and fluid spray nozzle are also prevented from freeze-up.

A fluid dispensing arrangement consisting of a fluid entrance tube inserted at the first end of the passageway serves as a means for dispensing fluid over the heating element so as to heat the fluid. Source of fluid may be windshield washer solution within vehicle's existing reservoir. The heated fluid is dispensed onto the windshield through a spray nozzle on the second end of the tube at the second end of the passageway. The fluid may be dispensed either hot or cold depending on whether the user chooses to use the heating means in conjunction with the fluid dispensing means or the fluid dispensing arrangement independent of the heating means.

The first and second ends of the passageway are sealed with a hose of rubber or similar material and with a water proof sealant. The ground and live wires with their respective terminals and connectors, spiral coiled heating element and its points of connection, fluid entrance tube, fluid exit tube and fluid spray nozzle all move in unison yet remain sealed and in tact during any adverse condition that a reciprocating blade and associated components may encounter.

Electric power is supplied to the heating element utilizing the vehicles existing power supply in any currently known manner using a 12 Volt system without the necessity of additional resistors. The circuitry is basically an electrical source connected to the heating element. The heating element also connects to a ground source. Simply stated current passes through the heating element and the heat is conducted into the body of the blade assembly and fluid within the passageway. Thus heating the outer surface of the squeegee and surrounding area as well as fluid to be dispensed when needed.

Field testing of this invention has proven successful in providing satisfactory wiping performance and heated fluid dispensing while simultaneously removing and keeping the windshield, wiper blade, frame linkage and spray nozzle free from interference by ice, sleet, road film and dirt with no apparent deterioration of the blade, wiping performance, heating element, or fluid dispensing embodiments. Secondarily warm solution is a better cleaner than a cold solution. However, if preferred fluid may be dispensed without the heating arrangement in operation or heating arrangement can be utilized without the dispensing of fluid.

It is therefor an object of the present invention to provide a new heated windshield wiper which may be easily and efficiently manufactured utilizing existing-styled blades or newly created blade; and is easily marketed.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the disclosed invention.

FIG. 2 details an expanded and exposed side view portion of a wiper blade comprising an electrical circuitry and a fluid dispensing arrangement.

FIG. 3 an enlarged top view portion illustrating position of end tubes and electrical connections.

FIG. 4 is an enlarged first end view of wiper blade illustrating extended motion positions of squeegee and fluid entrance tube.

FIG. 4A illustrates neutral position of wiper blade, squeegee, and fluid entrance tube.

FIG. 4B illustrates downward motion position of wiper blade, squeegee, and fluid entrance tube.

FIG. 4C illustrates upward motion position of wiper blade, squeegee, and fluid entrance tube.

FIG. 5 is an enlarged second end view of wiper blade illustrating extended motion positions of squeegee and fluid exit tube.

FIG. 5D illustrates neutral position of wiper blade, squeegee, and fluid exit tube.

FIG. 5E illustrates upward motion position of wiper blade, squeegee, and fluid exit tube.

FIG. 5F illustrates downward motion position of wiper blade, squeegee, and fluid exit tube.

DETAILED DESCRIPTION OF THE PREFERRED EMBODIMENT

Referring now in greater detail to the various figures of the drawing where in like reference characters refer to like pans. As shown in FIG. 1 the wiper blade body 5 is adapted to be connected to a wiper blade carrier (not shown) which is connected to a wiper arm (not shown). The elongated support spine 70 is positioned upon the wiper blade body 5. The spine 70 is part of the wiper blade body 5 which is adapted to be inserted through wiper blade carrier clips (not shown) of the blade carrier when assembling or removing wiper blade body 5.

FIG. 2 shows an exposed heated wiper blade comprising an electrical circuitry and a fluid dispensing arrangement. The complete system basically comprises a wiper blade body 5 with component parts. Passing through the wiper blade body 5 is a passageway 80 which contains a spiral coiled heating element 15, which consists of resistance wire, such as Nichrome, which heats the fluid 20 within the passageway 80, fluid exit tube 35, wiper blade body 5, and surrounding area including the vehicle windshield 115.

The wiper blade body 5 is comprised of elongated flexible resilient material which can withstand temperatures in excess of 220 degrees Fahrenheit; and is not damaged by significant and deliberate heating. Such materials may be Neoprene or Polymer; but other suitable materials may be used.

The spiraling of the spiral coiled heating element 15 allows the wiper blade body 5 and squeegee portion 10 to remain sufficiently flexible to be used with windshields of any lateral or longitudinal curvature. The spiral coiled heating element 15 has enough spring elasticity as not to allow it to suffer fatigue because of the stresses of the normal wiper action.

The process of coiling can be calibrated so as to maintain sufficient temperature and function; yet eliminate the need of resistors, timers, thermostats, multiple connectors, and complexity.

Length of resistance wire used in the spiral coiled heating element 15 varies according to blade length and wire gauge. Total ohms of resistance and amperage draw changes are necessary for each specified blade length to maintain proper heating level sufficient for proper functioning.

The wiper blade body 5 contains a passageway 80 through its entire length. The passageway 80 receives a spiral coiled heating element 15, fluid 20 for dispensing and/or heating, a portion of the second end of the fluid entrance tube 25 with bonded first connection 55 to first end of spiral coiled heating element 15, and a portion of the first end of the fluid exit tube 35 with bonded second connection 155 to second end of spiral coiled heating element 15, all of which also serve as current conductors.

The spiral coiled heating element 15 is received within the entire length of the passageway 80. Fluid 20 is also contained within the entire length of passageway 80. The passageway 80 contains a means of containing, heating, and conveying fluid 20.

Windshield washer hose 30 serves as fluid 20 conveyance means from fluid 20 within the vehicle's existing washer fluid reservoir (not shown) to first end of fluid entrance tube 25 and continues on outer circumference of fluid entrance tube 25 as the entrance tube insulator hose 130 to sealed first wiper end 75. Exit tube insulator hose 135 at sealed second wiper end 175 continues on outer circumference of fluid exit tube 35 and terminates at fluid spray nozzle 50.

Entrance tube insulator hose 130 serves to insulate fluid entrance tube 25 containing fluid 20 from the element of cold air and also serves as an electrical insulator between positive electrical terminal 40 and bonded first connection 55. Exit tube insulator hose 135 serves to insulate fluid exit tube 35 containing fluid 20 also from the element of cold air and serves as an electrical insulator between bonded second connection 155 and negative electrical terminal 140. Entrance tube insulator hose 130 is permanently sealed at sealed first wiper end 75 and exit tube insulator hose 135 is likewise sealed at sealed second wiper end 175 so as to contain fluid 20 within passageway 80. To prevent gravitational back flow of fluid 20 a check valve of prior art (not shown) could be implemented near or in the fluid entrance tube 25.

In FIG. 2 live wire 60 is energized by a vehicle battery (not shown) connected to positive electrical connector 45 which is connected to positive electrical terminal 40.

Positive electrical terminal 40 is soldered or otherwise bonded to fluid entrance tube 25 which then conducts current to and soldered or otherwise soldered or otherwise bonded first end connection 55 to first end of spiral coiled heating element 15 inside passageway 80. Second end of spiral coiled heating element 15 is soldered or otherwise bonded to second connection 155 to first end of fluid exit tube 35 inside passageway 80. Current is then conducted through the first end of the fluid exit tube 35 to soldered or otherwise bonded negative electrical terminal 140 which receives negative electrical connector 145 with ground wire 65. Live wire 60 and ground wire 65 consists of suitable material, such as stranded copper wire.

FIG. 2 comprises substantially all features and structure of the embodiments of the present invention, including a fluid dispensing arrangement. The fluid dispensing arrangement comprises a fluid entrance tube 25 which is connected on the first end to windshield washer hose 30 source of an unillustrated fluid supply which is injected into the passageway 80 of the wiper blade body 5, whereby it may be heated by the spiral coiled heating element 15. The outlet aperture is a fluid spray nozzle 50 which reciprocates in unison with wiper blade body 5 and allows a spray position always immediately ahead of squeegee 10 whether the wiper blade be moving upward or downward across the vehicle windshield 115. This arrangement allows fluid 20, such as windshield fluid, to be heated by the heating element 15 and subsequently dispensed through spray nozzle 50. This allows for near maximum the full heat content of the fluid 20 to be transferred directly to the windshield without significant heat loss. However if desired the fluid spray nozzle 50 can be constructed so as to remain stationary.

FIG. 3 shows an enlarged top view portion illustrating the neutral position of fluid entrance robe (not visible) covered with entrance tube insulator hose 130, fluid exit tube (not visible) covered with exit tube insulator hose 135, positive electrical terminal 40 and negative electrical terminal 140, positive electrical connector 45 and negative electrical connector 145, live wire 60 and ground wire 65; position of windshield washer hose 30 and fluid spray nozzle 50.

FIG. 4 shows enlarged wiper blade body first end with various positions of fluid entrance tube 25 as it wipes upward and downward across vehicle windshield 115. Fluid entrance tube neutral position 100A-A refers to position of fluid entrance tube 25 and squeegee 10 as seen when wiper blade body 5 is in upright position. Fluid entrance tube 25 downward position 105B-B refers to position of fluid entrance tube 25 and squeegee 10 as seen when wiper blade body 5 sweeps downward across the vehicle windshield 115. Fluid entrance tube 25 upward position 110 C-C refers to fluid entrance tube 25 and squeegee 10 as seen when wiper blade body 5 sweeps upward across the vehicle windshield 115.

FIG. 5 shows wiper blade body second end with various positions of fluid exit robe 35 as it wipes upward and downward across vehicle windshield 115. Fluid exit tube 35 neutral position 85D-D refers to position of fluid exit tube 35 and squeegee 10 as seen when wiper blade body 5 is in upright position. Fluid exit tube 35 upright position 90E-E refers to position of fluid exit tube 35 and squeegee 10 as seen when wiper blade body 5 sweeps upward across the vehicle windshield 115. Fluid exit tube downward position 95F-F refers to position of fluid exit tube 35 and squeegee 10 as seen when wiper blade body 5 sweeps downward across the vehicle windshield 115.

FIG. 1, 2, and 5 also illustrates windshield fluid spray nozzle 50 capability to spray fluid 20 just ahead of wiper blade body 5 and squeegee 10 whether they be moving upward or downward across vehicle windshield 115. Such an arrangement is extremely efficient.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawing and described in the specification are intended to be encompassed by the present invention.

We claim:

1. A heatable wiper blade assembly for wiping a surface, said assembly comprising:

an elongated, flexible, resilient, heat resistant wiper blade body having first and second opposite ends, said elongated body has a passageway extending longitudinally therethrough between said opposite ends thereof, each end of said body has an opening therein communicating with said passageway, said wiper blade body includes a spine for engagement with a wiper blade carrier and a squeegee portion for wiping a surface;

an elongated, flexible, spiral coiled heating element having first and second opposite ends, said heating element is hollow to form an open interior therethrough and at said ends thereof, said heating element is loosely received in said passageway with said first and second ends thereof lying within said body passageway;

an elongated fluid entrance tube of electrically conductive material has a first end received within the open interior of said heating element at the first end thereof and is bonded to said heating element inside the body passageway, said entrance tube acts as fluid conveying means and electrical current conducting means;

an elongated fluid exit tube of electrically conductive material has a first end received within the open interior of said heating element at the second end thereof and is bonded to said heating element inside the body passageway, said exit tube acts as fluid conveying means and electrical current conducting means;

a positive electrical terminal attached to said fluid entrance tube outside and spaced from said wiper blade body;

a negative electrical terminal attached to said fluid exit tube outside and spaced from said wiper blade body;

an entrance tube electrical insulator hose covers said fluid entrance tube and extends from said wiper blade body to at least said positive terminal;

an exit tube electrical insulator hose covers said fluid exit tube and extends from said wiper blade body to at least said negative terminal.

2. The wiper blade assembly recited in claim 1 wherein a spray nozzle is attached to a second end of the fluid exit tube.

\* \* \* \* \*